United States Patent
Hsu et al.

(10) Patent No.: US 8,793,434 B2
(45) Date of Patent: Jul. 29, 2014

(54) SPATIAL LOCALITY MONITOR FOR THREAD ACCESSES OF A MEMORY RESOURCE

(75) Inventors: Lisa Hsu, Kirkland, WA (US); Shekhar Srikantaiah, State College, PA (US); Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 444 days.

(21) Appl. No.: 13/178,851

(22) Filed: Jul. 8, 2011

(65) Prior Publication Data

US 2013/0013866 A1    Jan. 10, 2013

(51) Int. Cl.
G06F 12/00     (2006.01)
(52) U.S. Cl.
USPC .......................... 711/118; 711/160; 711/165
(58) Field of Classification Search
CPC .. G06F 12/0802; G06F 12/123; G06F 3/0647
USPC .......................................... 711/118, 160, 165
See application file for complete search history.

(56) References Cited

U.S. PATENT DOCUMENTS

2005/0144393 A1* 6/2005 Fanning .......................... 711/135
2008/0294846 A1* 11/2008 Bali et al. ....................... 711/118

OTHER PUBLICATIONS

Loh, Gabriel H., "Extending the Effectiveness of 3D-Stacked DRAM Caches with an Adaptive Multi-Queue Policy," 42nd Annual IEEE/ACM International Symposium on Microarchitecture, 2009 (MICRO-42), Dec. 12-16, 2009, pp. 1072-4451.
Qureshi Moinuddin K., and Patt, Yale N., "Utility-Based Cache Partitioning: A Low-Overhead, High-Performance, Runtime Mechanism to Partition Shared Caches," 39th Annual IEEE/ACM International Symposium on Microarchitecture, 2006 (MICRO-39), Dec. 2006, pp. 423-432.
AMD64 Architecture Programmer's Manual, vol. 2, Section 5.4.1, May 2011, pp. 137-141.

* cited by examiner

*Primary Examiner* — Gurtej Bansal
(74) *Attorney, Agent, or Firm* — Abel Law Group, LLP

(57) ABSTRACT

A method includes updating a first tag access indicator of a storage structure. The tag access indicator indicates a number of accesses by a first thread executing on a processor to a memory resource for a portion of memory associated with a memory tag. The updating is in response to an access to the memory resource for a memory request associated with the first thread to the portion of memory associated with the memory tag. The method may include updating a first sum indicator of the storage structure indicating a sum of numbers of accesses to the memory resource being associated with a first access indicator of the storage structure for the first thread, the updating being in response to the access to the memory resource.

28 Claims, 4 Drawing Sheets

SPATIAL LOCALITY MONITOR FOR THREAD ACCESSES OF A MEMORY RESOURCE

BACKGROUND

1. Field of the Invention

The invention is related to computing systems and more particularly to spatial locality of memory requests in computing systems.

2. Description of the Related Art

In a typical computing system, a memory system is designed with a goal of low latency experienced by a processor when accessing arbitrary units of data. In general, the memory system design leverages properties known as temporal locality and spatial locality. Temporal locality refers to multiple accesses of specific memory locations within a relatively small time period. Spatial locality refers to accesses of relatively close memory locations within a relatively small time period.

Typically, temporal locality is evaluated in terms of a granularity smaller than that of a next level in a memory hierarchy. For example, a cache captures a repeated access of blocks (e.g., 64 Bytes (B)), which is smaller than the storage granularity of main memory (e.g., 4 Kilobyte (KB) pages). Spatial locality is typically captured by storing quantities of data slightly larger than a requested quantity in order to reduce memory access latency in the event of sequential access. For example, a cache is designed to store 64B blocks, although a processor requests one to eight Bytes at a time. Meanwhile, the cache requests 64B at a time from a memory, which stores pages of 4 KB contiguous portions.

In general, typical memory system designs capture whatever temporal and spatial locality information that can be culled from the memory streams they are servicing in a strictly ordered and independent manner. For example, a level-two (L2) cache of a memory system having three cache levels only receives memory accesses missed in a level-one (L1) cache. A level-three (L3) cache only receives memory accesses that have already been filtered through both of the L1 and the L2 caches. Similarly, a dynamic random access memory (DRAM) only receives memory accesses that have been filtered through the entire cache hierarchy. Accordingly, each level of the memory hierarchy has visibility to only the temporal and spatial locality of memory accesses that have been passed from the previous level(s) of the hierarchy (e.g., cache misses) and only at the granularity of that particular level. Of particular interest is the filtering of memory accesses by a last-level cache (i.e., a cache level that is closest to the main memory), typically an L3 cache, to memory. In a typical memory system, the L3 cache and main memory form a shared memory portion (i.e., shared by all executing threads) and capture global access patterns. However, the memory system typically does not have a mechanism for providing information regarding thread characteristics with respect to page granularity because the L3 cache operates on blocks and filters information from the DRAM. Meanwhile, the DRAM operates on larger portions of memory, but receives filtered information from the L3 cache. Information regarding memory usage patterns of memory requests that enter the shared portion of the memory system (e.g., the L3 cache, after L1 and L2 cache filtering) may be used to make macro-level policy adjustments in various applications. Accordingly, techniques that provide information regarding an application or thread memory access patterns may be useful to improve performance of memory systems.

SUMMARY OF EMBODIMENTS OF THE INVENTION

In at least one embodiment of the invention, a method includes updating a first tag access indicator of a storage structure. The tag access indicator indicates a number of accesses by a first thread executing on a processor to a memory resource for a portion of memory associated with a memory tag. The updating is in response to an access to the memory resource for a memory request associated with the first thread to the portion of memory associated with the memory tag. In at least one embodiment, the method includes updating a first sum indicator of the storage structure indicating a sum of numbers of accesses to the memory resource being associated with a first access indicator of the storage structure for the first thread. The updating is in response to the access to the memory resource. In at least one embodiment, the method includes updating the first sum indicator in response to an access to the memory resource associated with the first thread and a second tag access indicator of the storage structure.

In at least one embodiment of the invention, an apparatus includes a memory tag storage element configured to store a memory tag associated with an access to a memory resource by a thread executing on a processor. The memory access is based on a memory request by the thread to the portion of memory associated with the memory tag. The method includes a tag access indicator storage element configured to store a number of accesses to the memory resource by the thread associated with the memory tag.

In at least one embodiment of the invention, a tangible computer-readable medium encodes a representation of an integrated circuit that includes an apparatus including a memory tag storage element configured to store a memory tag associated with an access to a memory resource by a thread executing on a processor. The access is based on a memory request by the thread to the portion of memory associated with the memory tag. The method includes a tag access indicator storage element configured to store a number of accesses to the memory resource by the thread associated with the memory tag.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
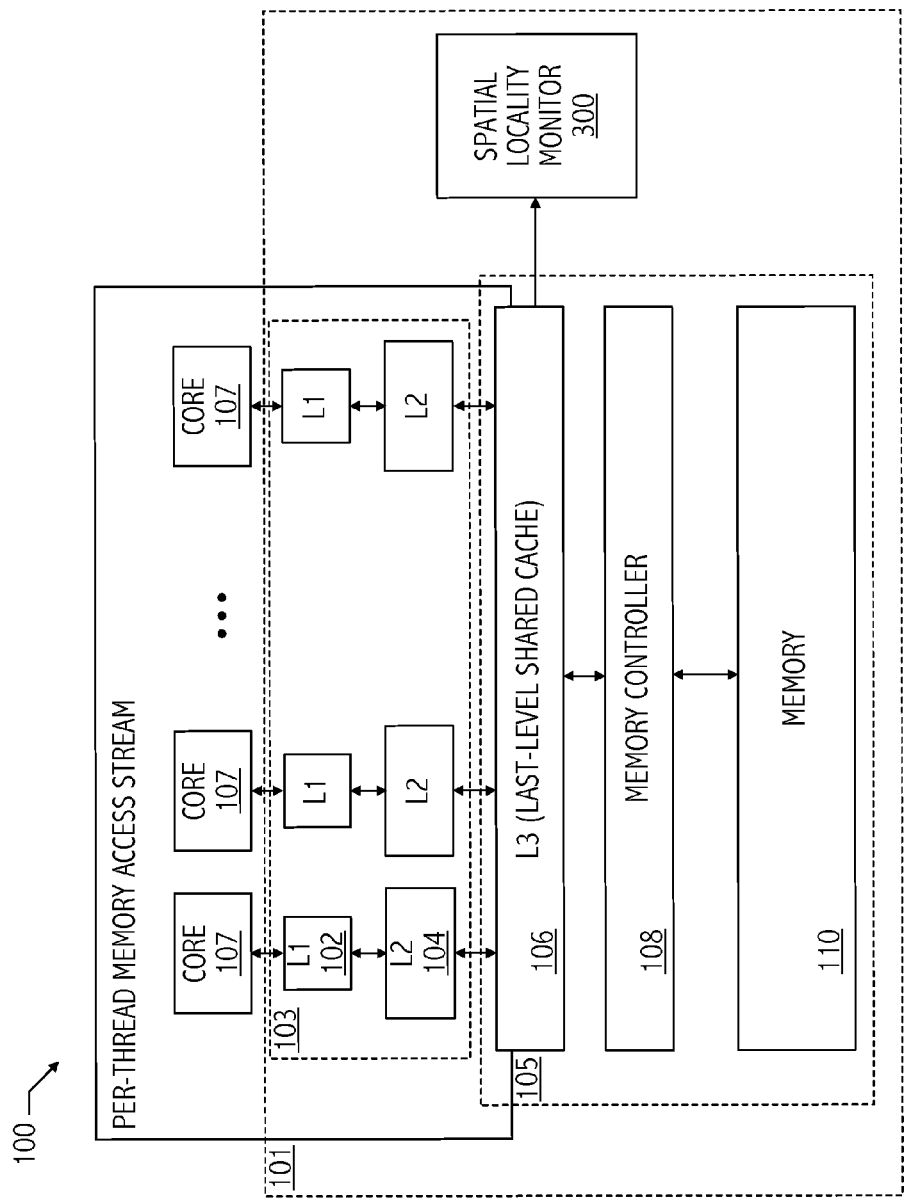
FIG. 1 illustrates a functional block diagram of an exemplary processing system.

Referring to FIG. 1, in an exemplary processing system (e.g., system 100), multiple threads (e.g., thread 0 and thread 1) execute on the system concurrently on one or more processors (e.g., cores 107). A memory system (e.g., memory system 101) includes private portions (e.g., memory portion 103) used for storing data for a particular processor (i.e., threads executing on the processor access only a portion of the personal memory space allocated to the processor) and a shared portion (e.g., memory portion 105) of memory that can store data on behalf of multiple processors of system 100. In at least one embodiment, memory system 100 includes a multi-level cache (e.g., a multi-level cache including level-one caches (L1) 102, level-two caches (L2) 104, and a shared, last-level cache, e.g., level-three cache (L3) 106, which is the boundary between the per-thread portion of the memory system and the unified access portion of the memory system), a memory controller (e.g., memory controller 108) and main memory (e.g., memory 110). In at least one embodiment of memory system 101, the L1 and L2 caches form memory portion 103, and last-level cache (L3) 106 and memory 110 form memory portion 105.

In general, information stored in a typical cache is redundant to information stored in memory 110 and is not visible to an operating system executing on one or more of processors 107. In at least one embodiment, last-level cache 106 is a stacked memory, i.e., a memory (e.g., dynamic random access memory (DRAM)) that is stacked on top of an integrated circuit including one or more of processors 107 to increase the capacity of the last-level cache from that which may typically be implemented on an integrated circuit including processors 107. When used as a last-level cache, the contents of the stacked memory are redundant to information stored in memory 110 and the stacked memory is not visible to an operating system executing on one or more of processors 107.

In at least one embodiment of memory system 101, memory controller 108 provides the one or more processors access to a particular portion of memory space (e.g., memory 110). Memory controller 108 stores memory requests received from cores 107 in at least one memory request queue. A scheduler of memory controller 108 schedules memory requests received from thread 0 and thread 1 and stored in the memory request queue to memory 110. Memory system 100 includes a spatial locality monitor module (e.g., spatial locality monitor 300), which monitors the frequency of memory address access by threads executing on system 100.

Figure 2:
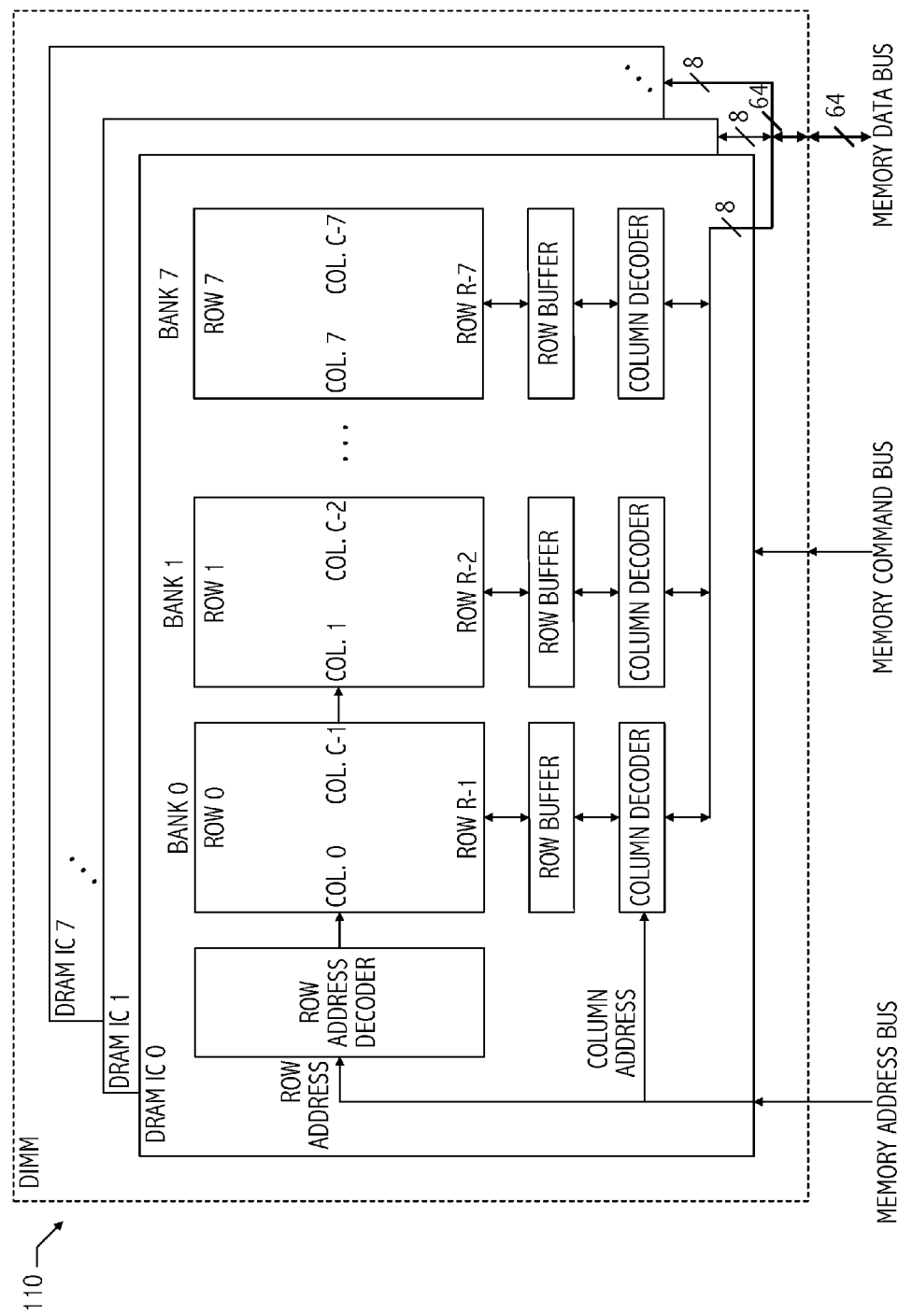
FIG. 2 illustrates a functional block diagram of an exemplary main memory 110 of the computing system of FIG. 1.

Referring to FIG. 2, in at least one embodiment, memory 110 includes one or more memory integrated circuits (e.g., one or more DRAM integrated circuits). In at least one embodiment, the memory system includes multiple memory integrated circuits, which are accessed in parallel (e.g., configured as a dual in-line memory module, i.e., DIMM). In at least one embodiment of the memory system, each memory integrated circuit includes a data interface (e.g., an 8-bit data interface) that is combined with data interfaces of other memory integrated circuits to form a wider data interface (e.g., 64-bit data interface). In at least one embodiment of the memory system, each memory integrated circuit includes multiple independent memory banks, which can be accessed in parallel. In at least one embodiment of the memory system, each memory bank includes a two-dimensional array of DRAM cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read command or a write command can read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which, in an embodiment, has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which, in an embodiment, has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

In at least one embodiment of memory system 101, stacked memory is included in memory 110. The stacked memory is closer to the processor(s) and has a lower access latency than other off-chip memory. When included in memory 110, the contents of the stacked memory are not redundant to information stored in other portions of memory 110 and the stacked memory is visible to an operating system executing on one or more of processor cores 107 in FIG. 1.

A technique that measures the utility of cache ways in order to globally allocate cache space between sharers of the cache includes Utility Cache Partitioning (UCP), which uses Utility Monitors (UMON) to track the utility of the cache between sharing threads. The technique includes hardware thread shadow tags for each of the sets in a subset of all the sets in the cache. These shadow tags are used to simulate the behavior of each thread in the cache as if they had the entire cache to themselves. Each way of the sets has an associated hit counter that tracks the total number of hits to the sampled ways. Thus, after a period of time, the counters provide information regarding how well each thread would have used 1, 2, . . . , up to N ways of the cache. That information is then used to partition the cache on a way granularity to provide a globally determined effective use of the cache between sharers. Although UCP and UMON and other cache utility measurement techniques measure cache usage characteristics of individual threads running on a shared cache, additional information regarding individual spatial locality at the application level would provide more insight into memory system usage that is not limited to only cache usage.

In an AMD64 processor implementation, a basic technique for measuring page access patterns utilizes an "Access" bit in AMD64 page table entries. Any time a page is accessed, the hardware sets the bit to 1, where it will remain set until cleared by software. Thus, depending upon the frequency of software clearing, an approximate measure of page access frequency can be tracked, but provides no distinction between accesses by different threads executing on the system simultaneously.

Referring back to FIG. 1, spatial locality monitor 300 provides access pattern information that may be used in various applications to improve performance. A memory management technique for an exemplary memory 110 including a stacked memory architecture determines which data to move, in which granularity, and when to move it from memory 110 into stacked memory (e.g., stacked DRAM). Typical memory management techniques (e.g., simple demand-based paging) may be insufficient because the size of memory units to be moved on chip (pages, e.g., 4 KB) uses a substantial amount of bandwidth. In at least one embodiment, spatial locality monitor 300 provides information useful for memory management of stacked memory architectures, including an indicator of which pages are frequently accessed. Then, a memory management unit can bring those frequently accessed pages on chip in a manner that amortizes the bandwidth usage over many memory requests. In at least one embodiment, spatial locality monitor 300 provides an indication of the spatial locality of an access stream, such that frequently accessed pages are loaded into the stacked memory, while other pages that are accessed relatively infrequently remain in off-chip memory.

In another application of a typical processing system, the cache captures the temporal locality of blocks of data and DRAM row buffers capture the spatial locality of blocks of data, but typical memory management techniques do not use this information since memory allocations are done both independently and in series. In at least one embodiment, spatial locality monitor 300 monitors memory usage characteristics of currently executing threads (e.g., the amount of memory resource sharing between disparate threads of execution) for use by a resource management technique to improve global performance over other memory management techniques that use a series of locally optimal techniques along a serial memory hierarchy.

In memory hierarchy reconfiguration, since different types of software applications have different general characteristics, it can be very difficult to design memory hierarchies to satisfy the widely varying needs of so many types of software. In at least one embodiment, spatial locality monitor 300 provides information regarding memory access characteristics of runtime applications to an operating system executing on one or more of processors 107. The operating system uses the information to configure the memory hierarchy (or alternatively, affect page allocation algorithms) to suit the needs of the executing application(s). For example, the operating system may allocate different pages in memory to different threads, remap resources (e.g., to/from stacked memory), and/or schedule a thread based on that information.

Figure 3:
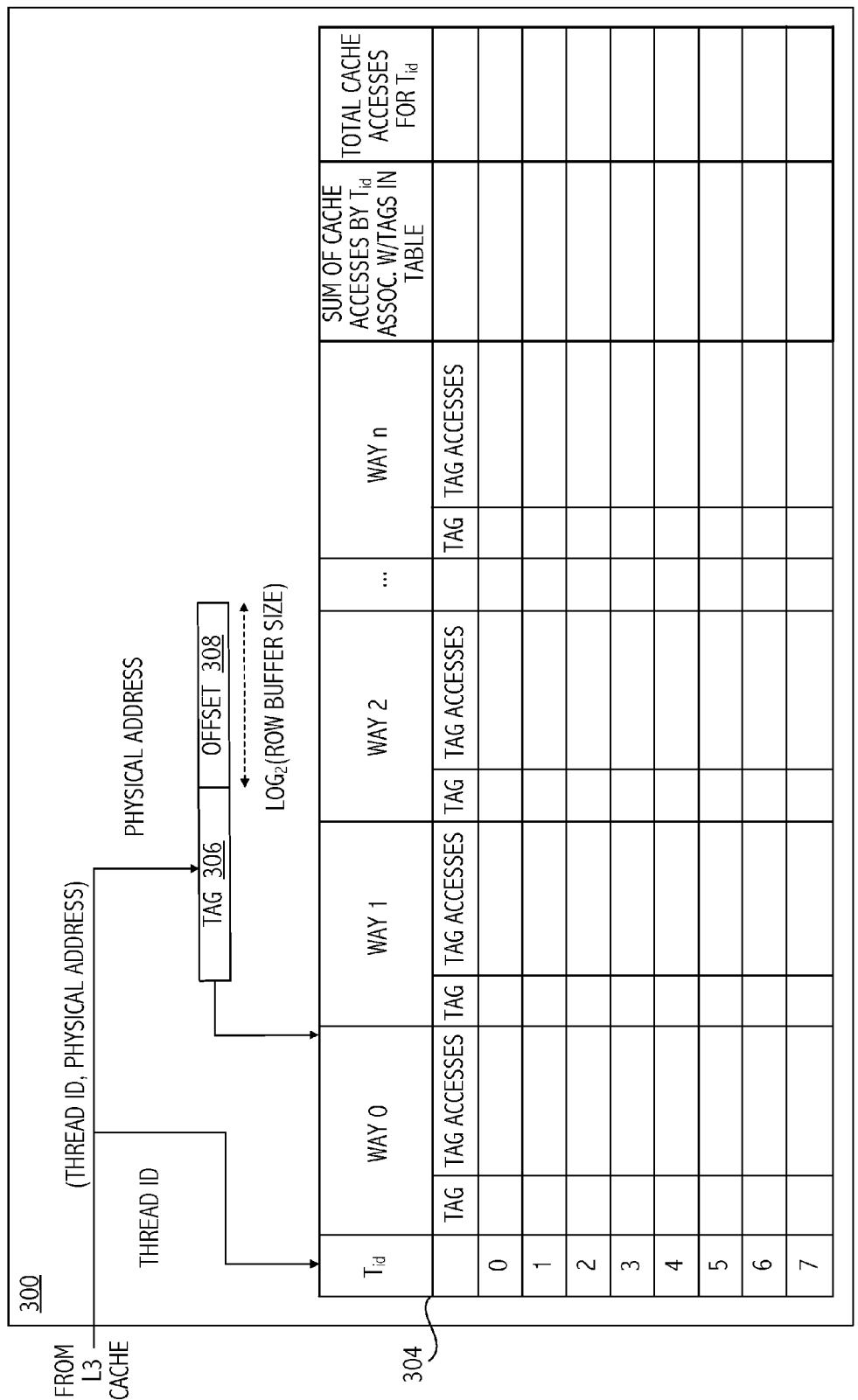
FIG. 3 illustrates a spatial locality tracking module consistent with at least one embodiment of the invention.

Referring to FIG. 3, in at least one embodiment, spatial locality monitor 300 stores frequency access information for portions of memory in a granularity greater than a cache line size. In at least one embodiment of spatial locality monitor 300, the granularity is the same size as a DRAM row buffer (e.g., DRAM pages), although other embodiments of spatial locality monitor 300 have different granularities. Spatial locality monitor 300 captures most recently accessed DRAM rows, regardless of which bank they are eventually mapped to, and their access frequencies. This information is indicative of the locality characteristics of a memory access stream. Spatial locality monitor 300 captures addresses for cache hits and cache misses for memory requests as they access the last-level cache. Capturing both hits and misses abstracts away perturbations caused by the size, organization, and sharing properties of the cache for an individual thread. Note that this technique makes no assumptions about the underlying address mapping mechanism of the associated DRAM and thus is independent of DRAM organization. In at least one embodiment of spatial locality monitor 300, the device parameters of the shared cache and memory do not affect this measurement.

In at least one embodiment of spatial locality monitor 300, a storage structure (e.g., storage structure 304) is a two-dimensional table having rows that are indexed by hardware thread identifiers (e.g., $T_{id}$). Physical memory addresses are split into two portions, a tag and an offset. The offset refers to the offset within a memory portion (e.g., DRAM row), and the tag is the remainder of the physical address (e.g., the DRAM row address). In at least one embodiment of spatial locality monitor 300, the tag of an access is stored in storage structure 304. In at least one embodiment, storage structure 304 is an associative cache of the most frequently accessed DRAM rows for each thread. Associated with each tag is an access frequency. In at least one embodiment of spatial locality monitor 300, each row of storage structure 304 also contains a summary field, which indicates the sum of all the access frequencies currently stored in the table for that thread, so as to easily expose the total access frequency represented by the most-recently accessed DRAM rows. Additionally, storage structure 304 includes a total accesses field for each thread that tracks the total number of accesses by that thread, including those that are not represented in the table.

Figure 4:
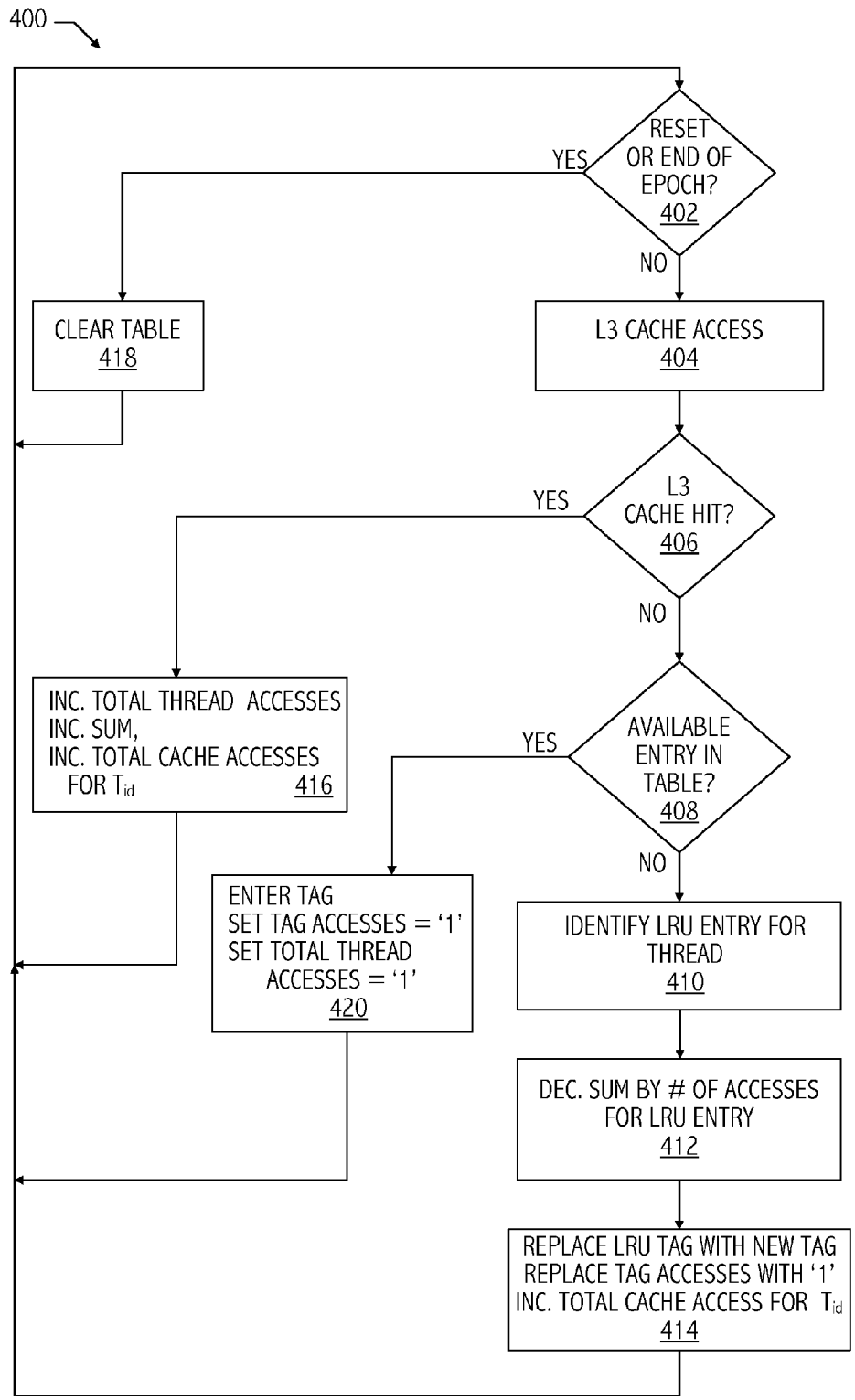
FIG. 4 illustrates information and control flows of monitor module 302 of the spatial locality tracking module of FIG. 3, consistent with at least one embodiment of the invention.

Referring to FIGS. 3 and 4, in at least one embodiment of spatial locality monitor 300, each memory access by a thread that does not hit in the private cache hierarchy (e.g., L1 and L2 caches) of the processor, indexes into spatial locality monitor 300 using a thread identifier and physical address. In at least one embodiment of spatial locality monitor 300, if spatial locality monitor 300 is reset or has reached an end of an epoch (402), spatial locality module 300 adjusts contents of (e.g., ages or resets to an initial state) storage structure 304 (418). In at least one embodiment, spatial locality monitor 300 directly uses the thread identifier to select a row in storage structure 304. For example, a portion of the memory address excluding the right-most bits (e.g., $\log_2$(row buffer size) bits) are used as a tag. An associative search across the appropriate $T_{id}$ row for the tag results in either a hit or a miss (406). In at least one embodiment of spatial locality monitor 300, if the associative search results in a hit, spatial locality monitor 300 increments an accesses field that corresponds to the tag, a total row sum field, and a total accesses field (416). If the associative search results in a miss and an entry in storage structure 304 is available for the associated tag (408), then spatial locality monitor 300 enters the tag in that available entry and increments the accesses field, sum field, and total accesses field for that tag (420). If the associative search results in a miss and storage structure 304 has no available entries for the associated tag (408), a spatial locality monitor 300 identifies a least-recently-used tag (410). Spatial locality monitor 300 then decrements the row sum by the contents of the accesses field of the evicted tag (412) and replaces a least-recently-used tag with a tag for the current memory access, replaces the tag accesses field with '1', and increments the total cache accesses for the thread (414). Note that the order of information and control flow of FIG. 4 is exemplary only and the sequence varies in other embodiments of spatial locality monitor 300.

In at least one embodiment of spatial locality monitor 300, a physical memory address is 32-bits wide and memory 110 includes a DRAM with a row buffer size of 2 KB. Upon reset (e.g., system reset or end of an epoch), spatial locality monitor 300 adjusts (e.g., resets to an initial state or ages) the contents of storage structure 304. While thread 0 executes on system 100, if thread 0 requests access to memory address 0xFFFFFFFF and the request misses in the private cache hierarchy, the request is forwarded to the last-level cache. Spatial locality monitor 300 enters tag 0x1FFFFF (i.e., 0xFFFFFFFF right-shifted by log 2(2 KB)=11 bits) into storage structure 304 at index 0, which corresponds to thread 0. Spatial locality monitor 300 sets the accesses field associated with this tag to one, the sum field associated with the thread to one, and the total accesses field for the thread to one. As new memory requests arrive at the L3 cache, they are entered into the spatial locality monitor 300 in a similar manner.

If a second memory request arrives at the L3 cache from thread 0 associated with address 0xFFFFFF00, regardless of whether the memory request hits in the L3 cache or not, the memory request will index into storage structure 304 at index 0, and generate a tag match with tag 0x1FFFFF, since 0xFFFFFF00 right-shifted by 11 is 0x1FFFFF. As a result, spatial locality monitor 300 increments by one the accesses field, the sum field, and the total accesses field. Spatial locality monitor 300 logically moves this tag entry to a most-recently-used position for that thread, or in another embodiment, sets an indicator of most-recently-used status for the thread of this tag entry. If a third memory request that arrives at the last-level from thread 0 has an address of 0x11111111, all ways of the index are taken, and there is no tag match, spatial locality monitor 300 evicts the least-recently used tag of the row to make room for tag entry 0x022222 (i.e., 0x11111111>>11 bits). In addition, spatial locality monitor 300 decrements the sum field for the row by the value of the accesses associated with the evicted tag. Spatial locality monitor 300 sets the accesses field associated with the incoming tag to one, increments the sum field by one, and increments the total accesses field by one. Accordingly, the sum field represents the sum of all of the memory accesses held in the table by all the tag entries for the thread and the total accesses field represents all the accesses by the thread.

As described above, spatial locality monitor 300 retains the N most-recently-accessed memory rows for each thread, along with indications of how frequently they are accessed relative to each other and relative to all memory accesses of the thread. For example, a sum field entry for a thread that is much smaller than a total accesses field for the thread indicates that memory accesses by that thread are spread out throughout the memory address space. A sum field entry for a thread that is approximately equal to the total accesses field for the thread indicates that memory accesses for that thread are relatively concentrated to a limited number of row-granular portions of memory. An accesses field for a thread that is much larger than an accesses field for another thread indicates that the former has many more accesses per time than the latter. The combination of those indicators can be used by an operating system or memory management unit to differentiate between threads with dense spatial locality from those with lesser spatial locality. In at least one embodiment, after a period of time (e.g., an epoch), spatial locality monitor 300 clears all fields to prevent stale measurements from affecting performance.

In at least one embodiment of spatial locality monitor 300, storage structure 304 has N ways, where N is the number of DRAM banks accessible by the associated memory controller. That number of ways reduces or avoids conflict misses if a memory access pattern stripes all the way through every bank repeatedly. However, the amount of associativity is a design tradeoff and may vary in other embodiments.

In at least one embodiment, spatial locality monitor 300 tracks the most frequently accessed rows regardless of which DRAM bank to which a memory access might eventually be mapped. Thus, spatial locality monitor 300 tracks the access locality going into the shared memory hierarchy irrespective of DRAM organization. The information obtained during runtime by spatial locality monitor 300 can provide insight into the amount of spatial locality present in a stream of accesses regardless of the topology and organization of a shared memory hierarchy, even when threads execute on a multi-threaded platform simultaneously with other threads. That information can be used in a number of possible ways (e.g., by a memory controller or an operating system executing on one or more processors): to determine when to bring off-chip memory onto stacked memory, to make coordinated usage and/or allocation decisions for resources of a memory hierarchy on a per-thread basis instead of using a strictly ordered and independently greedy mechanism of current systems, to inform an operating system about fundamental access patterns for potential memory hierarchy reconfiguration, and/or to provide an operating system with information on which to base page allocation decisions. By exposing the potential spatial locality characteristics of a thread, an increasingly coordinated approach to resource allocation across the shared memory hierarchy is possible.

Structures described herein may be implemented using software executing on a processor (which includes firmware) or by a combination of software and hardware. Software, as described herein, may be encoded in at least one tangible computer-readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which an SDRAM memory system is used, one of skill in the art will appreciate that the teachings herein can be utilized for other memory systems (e.g., phase change memory systems or memristor memory systems). Variations and modifications of the embodiments disclosed herein may be made based on the description set forth herein, without departing from the scope and spirit of the invention as set forth in the following claims.

What is claimed is:

1. A method comprising:
    updating a first tag access indicator of a storage structure, the tag access indicator indicating a number of accesses by a first thread of a plurality of threads executing on a processor to a memory resource for a portion of memory associated with a memory tag, the updating being in response to an access to the memory resource for a memory request associated with the first thread to the portion of memory associated with the memory tag, wherein the portion of memory corresponds to at least one memory row buffer and the first tag access indicator is one of a plurality of tag access indicators of the storage structure, the plurality of tag access indicators indicating a plurality of corresponding spatial localities of accesses to the memory resource for the plurality of threads.

2. The method, as recited in claim 1, further comprising:
updating a total access indicator indicating a total number of memory accesses to the memory resource by the thread during a current epoch in response to the access to the memory resource; and
updating the total access indicator in response to an access to the memory resource associated with the first thread and a second tag access indicator of the storage structure.

3. The method, as recited in claim 1, further comprising:
adjusting at least a portion of the storage structure in response to an end of an epoch.

4. The method, as recited in claim 1, wherein the access to the memory resource can be a hit and can be a miss.

5. The method, as recited in claim 1, wherein the memory resource is a cache level closest to main memory.

6. The method, as recited in claim 1, further comprising:
allocating resources to the first thread by an operating system based on contents of the storage structure.

7. The method, as recited in claim 1, further comprising:
adjusting a thread usage policy for the memory resource based on contents of the storage structure.

8. The method, as recited in claim 1, further comprising:
mapping data to stacked memory based on contents of the storage structure.

9. The method, as recited in claim 1, wherein the memory tag is a portion of a memory address and the portion of memory includes multiple row buffers.

10. The method, as recited in claim 1, further comprising:
updating a first sum indicator of the storage structure indicating a sum of numbers of accesses to the memory resource being associated with a first access indicator of the storage structure for the first thread, the updating being in response to the access to the memory resource; and
updating the first sum indicator in response to a second access to the memory resource, the second access being associated with the first thread and a second tag access indicator of the storage structure.

11. The method, as recited in claim 10, further comprising:
reducing the first sum indicator by a value of a third tag access indicator associated with a least-recently used memory tag for the thread in response to a third access to the memory resource associated with a third memory tag, the third memory tag being absent from the storage structure; and
replacing with the third memory tag, an entry in the storage structure associated with a least-recently used memory tag, and resetting the tag access indicator of the entry to an initial value, in response to the third access.

12. An apparatus comprising:
a storage structure comprising a plurality of entries corresponding to a plurality of threads executing on a processor, each of the plurality of entries being accessible using a thread identifier, the plurality of entries indicating a plurality of corresponding spatial localities of accesses to the memory resource for the plurality of threads, wherein each of the plurality of entries comprises:
a memory tag storage element configured to store a memory tag associated with an access to the memory resource by a thread of the plurality of threads, the access being based on a memory request by the thread to a portion of memory associated with the memory tag, the portion of memory corresponding to at least one memory row buffer; and
a tag access indicator storage element configured to store a number of accesses to the memory resource by the thread associated with the memory tag.

13. The apparatus, as recited in claim 12, wherein the memory tag storage element and the tag access indicator storage element form at least a portion of a row of an associative cache for the thread.

14. The apparatus, as recited in claim 12, wherein the memory resource is a cache level closest to main memory.

15. The apparatus, as recited in claim 12, wherein the memory resource is a stacked Dynamic Random Access Memory (DRAM).

16. The apparatus, as recited in claim 12, further comprising:
a controller operable to adjust a thread usage policy for the memory resource based on contents of the storage structure.

17. The apparatus, as recited in claim 12, further comprising:
at least one additional memory tag storage element configured to store at least one additional memory tag corresponding to at least one additional access to the memory resource by the thread based on at least one corresponding additional memory request to the portion of memory associated with the additional memory tag; and
at least one additional tag access indicator storage element configured to store a number of accesses to the memory resource by the thread associated with the at least one corresponding additional memory tag.

18. The apparatus, as recited in claim 17, further comprising:
a sum indicator storage element configured to store a sum indicator indicating a sum of the contents of the tag access indicator storage element and the contents of the at least one additional tag access indicator storage element.

19. The apparatus, as recited in claim 18, further comprising:
a total access storage element configured to store a total indicator indicating a total number of accesses to the memory resource associated with the thread during an epoch.

20. The apparatus, as recited in claim 19, further comprising:
a monitor module configured to update the tag access indicator storage element based on a memory access by the thread to the memory resource in response to a memory access associated with the memory tag.

21. The apparatus, as recited in claim 20,
wherein the monitor module is further configured to update the sum indicator storage element in response to the access to the memory resource and in response to the at least one additional access to the memory resource, and
wherein the monitor module is further configured to update the total access indicator in response to the access to the memory resource and in response to the at least one additional access to the memory resource.

22. The apparatus, as recited in claim 21,
wherein the monitor module is further configured to adjust at least a portion of the storage structure in response to an end of an epoch.

23. The apparatus, as recited in claim 21,
wherein the monitor module is further configured to update the sum indicator by a value of an access indicator associated with a least-recently used one of the memory tag and the at least one additional memory tag in response to a next access to the memory resource associated with a next memory tag not having a corresponding memory tag storage element; and wherein the monitor module is further configured to replace the least-recently used one of the memory tag and the at least one additional memory tag with the next memory tag and configured to reset the corresponding tag access indicator to an initial value, in response to the next access.

24. A tangible computer-readable medium encoding a representation of an integrated circuit that comprises:

a storage structure comprising a plurality of entries corresponding to a plurality of threads executing on a processor, each of the plurality of entries being accessible using a thread identifier, the plurality of entries indicating a plurality of corresponding spatial localities of accesses to the memory resource for the plurality of threads, wherein each of the plurality of entries comprises:

a memory tag storage element configured to store a memory tag associated with an access to a memory resource by a thread of the plurality of threads, the access being based on a memory request by the thread to the portion of memory associated with the memory tag, the portion of memory corresponding to at least one memory row buffer; and a tag access indicator storage element configured to store a number of accesses to the memory resource by the thread associated with the memory tag.

25. The tangible computer-readable medium, as recited in claim 24, wherein the integrated circuit further comprises:

at least one additional memory tag storage element configured to store at least one additional memory tag corresponding to at least one additional access to the memory resource by the thread based on at least one corresponding additional memory request to the portion of memory associated with the additional memory tag; and at least one additional tag access indicator storage element configured to store a number of accesses to the memory resource by the thread associated with the at least one corresponding additional memory tag.

26. The tangible computer-readable medium, as recited in claim 24, wherein the memory resource is a cache level closest to main memory.

27. The tangible computer-readable medium, as recited in claim 24, wherein the integrated circuit further comprises:

a sum indicator storage element configured to store a sum indicator indicating a sum of the contents of the tag access indicator storage element and the contents of the at least one additional tag access indicator storage element; and a total access storage element configured to store a total indicator indicating a total number of accesses to the memory resource associated with the thread during an epoch.

28. The tangible computer-readable medium, as recited in claim 27, wherein the integrated circuit further comprises:

a monitor module configured to update the tag access indicator storage element based on a memory access by the thread to the memory resource in response to a memory access associated with the memory tag, wherein the monitor module is further configured to update the sum indicator storage element in response to the access to the memory resource and in response to the at least one additional access to the memory resource, and wherein the monitor module is further configured to update the total access indicator in response to the access to the memory resource and in response to the at least one additional access to the memory resource.

* * * * *